(No Model.)
R. CLARKE.
SERVICE TANK FOR WATER CLOSETS.
No. 354,536. Patented Dec. 21, 1886.
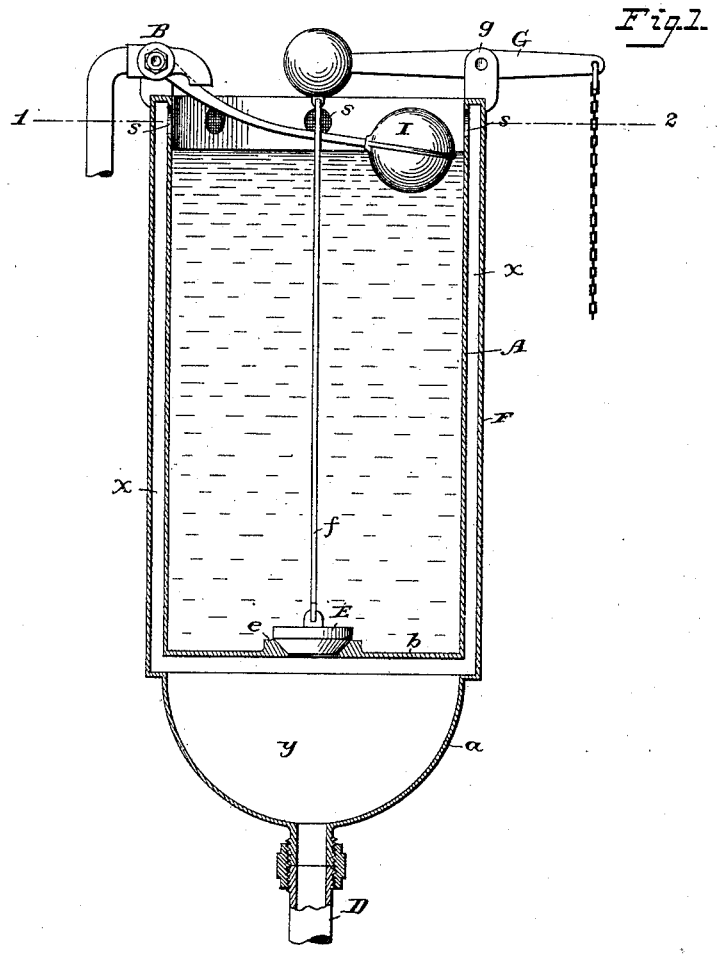
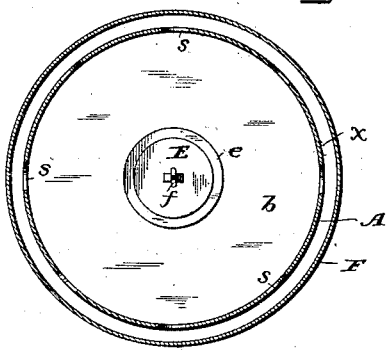
Attest:
Court A Cooper,
A. E. Hansmann.
Robert Clarke,
Inventor:
By Foster & Freeman
Attys.

UNITED STATES PATENT OFFICE.

ROBERT CLARKE, OF GRAVESEND, NEW YORK.

SERVICE-TANK FOR WATER-CLOSETS.

SPECIFICATION forming part of Letters Patent No. 354,536, dated December 21, 1886.

Application filed January 15, 1886. Serial No. 188,668. (No model.)

*To all whom it may concern:*

Be it known that I, ROBERT CLARKE, a citizen of the United States, residing at Gravesend, in the county of Kings and State of New York, have invented certain new and useful Improvements in Service-Tanks for Water-Closets, &c., of which the following is a specification.

My invention relates to that class of water-tanks termed "supply-tanks" or "service-tanks," used for maintaining a supply of water, which is discharged from time to time in quantities sufficient to flush the basin of a water-closet; and my invention consists in constructing the tank with an outer casing and intervening chamber, and in forming a reservoir in the outer casing, all as set forth hereinafter, so as to prevent the condensation of moisture upon the outside of the tank and generally increase the efficiency of the apparatus.

In the accompanying drawings, Figure 1 is a sectional elevation of a supply-tank illustrating my improvement. Fig. 2 is a sectional plan on the line 1 2, Fig. 1.

Much inconvenience results in the use of the ordinary flush-tanks employed with water-closets, from the fact that the supply of water introduced into the tanks, which are constantly replenished, tends to maintain the surfaces of said tanks at a lower temperature than that of the air within the room, and causes a condensation of the moisture in the air and its collection upon the outer surface of the tank, from which it drips. In order to prevent this result I construct the tank with a hollow body, or of two casings with an intervening space which communicates with the flushing-pipe, so that the outer face of the tank will be maintained at the temperature of the air in the room, while any collection of moisture upon the outer face of the inner casing or lining of the tank will pass to the flush-pipe. The tank may be constructed in different ways so as to secure this result. As shown in the drawings, it consists of the outer casing, F, and the inner casing, A, united at the top so as to inclose a chamber, $x$, and the bottom $a$ of the outer casing, F, is preferably dished and projected downward below the bottom $b$ of the inner casing, so as to form an intervening reservoir, $y$, which communicates with the chamber $x$. The flush-pipe D extends from the bottom of the chamber or reservoir $y$ to the basin, and in the bottom $b$ is an opening surrounded by a valve-seat, $e$, to which is fitted a valve, E, connected by a rod or chain, $f$, to the usual operating-lever, G, the pivot of which is supported by ears $g$ upon the tank. In the inner case, A, near the top, are one or more openings, $s$, and water passes through the inner case from a supply-cock, B, the plug of which is automatically turned by means of a float, I, connected thereto and operating in the usual manner.

Inasmuch as the outer casing, F, is not in contact with the body of water in the tank, the said casing is maintained at about the temperature of the air in the room, so that the moisture will not condense thereon or drip therefrom; while any condensation of moisture upon the inner casing from the passage of air to the chamber $x$ through the openings $s$ will pass through the chamber $x$ to the reservoir $y$, and thence to the flushing-pipe D.

When the valve E is raised, the water passes to the receptacle $y$, and the entrance of air through the openings $s$ permits this water to at once flow downward as a flushing charge into the basin, and should the float I fail to act, or the supply of water fail to be arrested at any time, the chamber $x$ would act as the overflow-channel, through which the water flowing out through the openings $s$ will pass to the reservoir $y$ and flushing-pipe D.

I do not limit myself to the construction of valve and operating appliances shown, nor to any particular form of tank or special construction of water-supply devices, as these may be varied without departing from the main features of my invention, and in some instances the reservoir $y$, instead of being formed by an extension of the outer case, F, may be otherwise formed.

I claim—

1. A service-tank having an inner water-casing, an outer casing, and an intervening chamber communicating with the flushing-pipe, substantially as set forth.

2. The combination, in a supply-tank, of an inner water-receiving casing, an outer casing arranged to form an intervening chamber and extended to form a reservoir below the inner casing, a flushing-pipe communicating with the reservoir, and the inner casing communicating with the reservoir through an opening provided with a valve, substantially as set forth.

3. The combination, with a supply-tank, of an inner casing provided with a valve, an outer casing arranged to form an intervening chamber, a reservoir below the said valve communicating with the said chamber and with the flushing-pipe, and an opening forming a communication near the top of the inner casing between the latter and the chamber, substantially as set forth.

In testimony whereof I have signed my name to this specification in the presence of two subscribing witnesses.

ROBERT CLARKE.

Witnesses:
   JOSEPH H. SAUNDERS,
   CHAPLIN MOOREHEAD.